Patented Feb. 18, 1947

2,415,838

UNITED STATES PATENT OFFICE 2,415,838

LUBRICATING COMPOSITION PREPARATION

John M. Musselman, South Euclid, and Herman P. Lankelma, Shaker Heights, Ohio, assignors to The Standard Oil Company, Cleveland, Ohio, a corporation of Ohio No Drawing. Application June 4, 1943, Serial No. 489,704

20 Claims. (Cl. 252—32.7)

If an ester wax or organic oxygen-containing compound treated with a phosphorus sulphide in reaction at relatively low temperature, below the boiling point of water for the generality of materials, to the formation of thiophosphoric compound, or if a higher temperature be employed, in a different reaction, with combining of sulphur and throwing out of phosphorus in sludge, substantially no phosphorus being combined, the products on further reacting with metal oxides or hydroxides form metal compounds. We have found that if such metal compounds be subjected to the action of sulphur or sulphur chloride or agents capable of liberating free sulphur, another reaction occurs, in which sulphur is further taken into combination in considerable amount, and thus where all the sulphur possible has been combined from reaction with phosphorus sulphide, the further reaction with sulphur can give an additional controlled in-put. There is some reason for believing that these metal compounds thus further subjected to the action of sulphur form disulphides and polysulphides. In any event however, the combined sulphur content can be raised over what is possible for compounds from phosphorus sulphide only, and the further sulphur reacted in can be controlled very closely. These products made from metal compounds have excellent lubricating properties, and are particularly advantageous in that they have a detergent action not found in known sulphur compounds.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The material which is subjected to reaction with sulphur in accordance with the present invention, as indicated is a metal compound of a reaction product of phosphorus sulphide on an organic oxygen-containing compound. The organic compound originally employed for the reaction product is desirably of rather high molecular weight, and preferably of at least 300° F. boiling point, and involves ester waxes, as lanolin, degras, sperm oil, esters, as alkyl or cycloparaffin or aryl esters of organic acids, fatty oils, higher carboxylic acid, saturated and unsaturated, monobasic and dibasic, petroleum acids, oxidized petroleum products such as naphthenic acid, rosin, modified rosins, also halogenated derivatives of any of these. Illustrative of some conveniently applicable materials are: beeswax, lanolin, sperm oil, other waxes, butyl stearate, ethyl lactate, methyl oleate, butyl ricinoleate, butyl phthalate, methyl stearate, methyl dichlorostearate, methyl chloronaphthenate, dichloropalmitic acid, cocoanut oil, other fatty oils, hydrogenated fatty oils, ethylene glycol mono ethers, diglycol chlorohydrine, stearic acid, oleic acid, palmitic acid, lauric acid, myristic acid, naphthalic acid, naphthoic acid, benzoic acid, naphthenic acids, hydroxystearic acid, dihydroxybenzoic acids, hydroxynaphthenic acids, dihydroxystearic acid, chlorobenzoic acid, dichlorostearic acids, dichlorobenzoic acid, dichlorodihydroxystearic acid, lactones, oxidized petroleum fatty acid, oxidized kerosene or gas oil or other oxidized petroleum oil, etc. And, as indicated, while the reaction with phosphorus pentasulphide or other phosphorus sulphide may be carried out at low temperature with formation of thiophosphoric compounds, it is preferable to use the higher temperature reaction which results in combination of sulphur in considerable percentage and substantially no combined phosphorus. Such reaction may generally be at a range of for instance 340 to around 400° F., or at least sufficient to give the products stated. Either products then subjected to reaction with an oxide or hydroxide of a metal, for example barium, calcium, zinc, sodium, potassium, aluminum, tin, lead, arsenic, chromium, etc., reaction occurring readily at temperatures of 70 to 200° F., form metal compounds. More than one metal may be applied with advantage. Such metal compounds are in accordance with the invention then subjected to reaction with sulphur. For this, elemental sulphur, sulphur chloride or other agent yielding free sulphur is used, heat being applied as necessary to bring about combination. Thus, 5 to 10 per cent of sulphur may be employed, and a temperature of 275 to 300° F., for 30 to 60 minutes.

As an example: The reaction product of degras heated with phosphorus pentasulphide at a temperature of 300° F. for an hour, and then converted into a metal compound by heating with 12 per cent of barium hydroxide and 2 per cent of calcium hydroxide at a temperature of 210° F. for 90 minutes, is reacted with 5 per cent of sulphur at a temperature of 300° F. for an hour.

The products may be applied as such in certain usages, as gear lubrication, or may be incorporated in oil of lubricating viscosity, as for instance 40 to 3,000 viscosity S. U. at 100° F., and in amounts for instance to provide 0.30 per cent or less of combined sulphur in the oil for highly refined oils, or larger amounts can be employed if desired, as up to 10 per cent or more of the product.

Illustrative of the action of the improved lubricants, the following tests with a test engine of Ethyl Gasoline Corp. design operating at 212° F. jacket temperature and 300° F. sump temperature for twenty hours continuous run, may be noted:

To an S. A. E. 30 commercial Mid-Continent lubricating stock there is added sulphur-reacted product of barium and calcium compound of reaction product from degras and $P_2S_5$, to give a sulphur content 0.75. After the end of the run the oil showed 0.80 per cent sludge, acid number 2.5, viscosity increase 97, and a wholly clean piston. In contrast, the oil alone on similar test had shown 5.0 per cent sludge, acid number 5, viscosity increase 427, and a badly coated piston.

Other modes of applying the principle of the invention may be employed, change being made as regards the details described, provided the features stated in any of the following claims, or the equivalent of such, be employed.

We therefore particularly point out and distinctly claim as our invention:

1. A composition of matter suitable for use as a lubricant and as an addition agent to a lubricating oil, which comprises the product of the reaction of sulfur reacted at a temperature at which sulfur reacts with an alkaline earth metal compound of the reaction product of a phosphorus sulfide reacted at a temperature of and above thiophosphate formation with an oxygen-containing compound selected from the group consisting of aliphatic, alicyclic and aromatic oxygen-containing compounds having a boiling point of at least 300° F. and forming an oil-miscible reaction product.

2. A composition of matter suitable for use as a lubricant and as an addition agent to a lubricating oil, which comprises the product of the reaction of sulfur reacted at a temperature at which sulfur reacts with a calcium compound of the reaction product of a phosphorus sulfide reacted at a temperature of and above thiophosphate formation with an oxygen-containing compound selected from the group consisting of aliphatic, alicyclic and aromatic oxygen-containing compounds having a boiling point of at least 300° F. and forming an oil-miscible reaction product.

3. A composition of matter suitable for use as a lubricant and as an addition agent to a lubricating oil, which comprises the product of the reaction of sulfur reacted at a temperature at which sulfur reacts with a metal compound of the reaction product of a phosphorus sulfide reacted at a temperature of and above thiophosphate formation with an ester boiling above 300° F.

4. A composition of matter suitable for use as a lubricant and as an addition agent to a lubricating oil, which comprises the product of the reaction of sulfur reacted at a temperature at which sulfur reacts with an alkaline earth metal compound of the reaction product of a phosphorus sulfide reacted at a temperature of and above thiophosphate formation with an ester boiling above 300° F.

5. A composition of matter suitable for use as a lubricant and as an addition agent to a lubricating oil, which comprises the product of the reaction of sulfur reacted at a temperature at which sulfur reacts with a metal compound of the reaction product of a phosphorus sulfide reacted at a temperature of and above thiophosphate formation with an oxygen-containing compound selected from the group consisting of aliphatic, alicyclic and aromatic oxygen-containing compounds having a boiling point of at least 300° F. and forming an oil-miscible reaction product.

6. A composition of matter suitable for use as a lubricant and as an addition agent to a lubricating oil, which comprises the product of the reaction of sulfur reacted at a temperature at which sulfur reacts with a metal compound of the reaction product of a phosphorus sulfide reacted at a temperature of and above thiophosphate formation with an ester wax.

7. A composition of matter suitable for use as a lubricant and as an addition agent to a lubricating oil, which comprises the product of the reaction of sulfur reacted at a temperature at which sulfur reacts with an alkaline earth metal compound of the reaction product of a phosphorus sulfide reacted at a temperature of and above thiophosphate formation with an ester wax.

8. A composition of matter suitable for use as a lubricant and as an addition agent to a lubricating oil, which comprises the product of the reaction of sulfur reacted at a temperature at which sulfur reacts with a metal compound of the reaction product of a phosphorus sulfide and an oxygen-containing organic compound selected from the group consisting of aliphatic, alicyclic and aromatic oxygen-containing compounds having a boiling point of at least 300° F. and forming an oil-miscible reaction product reacted at a temperature above thiophosphate formation to form said reaction product containing sulfur from said phosphorus sulfide and separated from a residue containing phosphorus from said phosphorus sulfide.

9. A composition of matter suitable for use as a lubricant and as an addition agent to a lubricating oil, which comprises the product of the reaction of sulfur reacted at a temperature at which sulfur reacts with an alkaline earth metal compound of the reaction product of a phosphorus sulfide and an oxygen-containing organic compound selected from the group consisting of aliphatic, alicyclic and aromatic oxygen-containing compounds having a boiling point of at least 300° F. and forming an oil-miscible reaction product reacted at a temperature above thiophosphate formation to form said reaction product containing sulfur from said phosphorus sulfide and separated from a residue containing phosphorus from said phosphorus sulfide.

10. A composition of matter suitable for use as a lubricant and as an addition agent to a lubricating oil, which comprises the product of the reaction of sulfur reacted at a temperature at which sulfur reacts with a metal compound of the reaction product of a phosphorus sulfide and an ester boiling above 300° F. reacted at a temperature above thiophosphate formation to form said reaction product containing sulfur from said phosphorus sulfide and separated from a residue containing phosphorus from said phosphorus sulfide.

11. A composition of matter suitable for use as a lubricant and as an addition agent to a lubricating oil, which comprises the product of the reaction of sulfur reacted at a temperature at which sulfur reacts with a metal compound of the reaction product of a phosphorus sulfide and an ester wax reacted at a temperature above thiophosphate formation to form said reaction prod- 12. A composition of matter suitable for use as a lubricant and as an addition agent to a lubricating oil, which comprises the product of the reaction of sulfur reacted at a temperature at which sulfur reacts with an alkaline earth metal compound of the reaction product of a phosphorus sulfide and an ester wax reacted at a temperature above thiophosphate formation to form said reaction product containing sulfur from said phosphorus sulfide and separated from a residue containing phosphorus from said phosphorus sulfide.

13. A composition of matter suitable for use as a lubricant and as an addition agent to a lubricating oil, which comprises the product of the reaction of sulfur reacted at a temperature at which sulfur reacts with a metal compound of the reaction product of a phosphorus sulfide and degras reacted at a temperature above thiophosphate formation to form said reaction product containing sulfur from said phosphorus sulfide and separated from a residue containing phosphorus from said phosphorus sulfide.

14. A composition of matter suitable for use as a lubricant and as an addition agent to a lubricating oil, which comprises the product of the reaction of sulfur reacted at a temperature at which sulfur reacts with the arsenic compound of the reaction product of a phosphorus sulfide and degras reacted at a temperature above thiophosphate formation to form said reaction product containing sulfur from said phosphorus sulfide and separated from a residue containing phosphorus from said phosphorus sulfide.

15. A composition of matter suitable for use as a lubricant and as an addition agent to a lubricating oil, which comprises the product of the reaction of sulfur reacted at a temperature at which sulfur reacts with the barium compound of the reaction product of a phosphorus sulfide and degras reacted at a temperature above thiophosphate formation to form said reaction product containing sulfur from said phosphorus sulfide and separated from a residue containing phosphorus from said phosphorus sulfide.

16. A composition of matter suitable for use as a lubricant and as an addition agent to a lubricating oil, which comprises the product of the reaction of sulfur reacted at a temperature at which sulfur reacts with the calcium and barium compound of the reaction product of phosphorus pentasulfide and degras reacted at a temperature above thiophosphate formation to form said reaction product containing sulfur from said phosphorus pentasulfide and separated from a residue containing phosphorus from said phosphorus sulfide.

17. A lubricant comprising a lubricating oil containing the product of the reaction of sulfur reacted at a temperature at which sulfur reacts with the metal compound of the reaction product of a phosphorus sulfide reacted at a temperature of and above thiophosphate formation with an oxygen-containing organic compound selected from the group consisting of aliphatic, alicyclic and aromatic oxygen-containing compounds having a boiling point of at least 300° F. and forming an oil-miscible reaction product.

18. A lubricant comprising a lubricating oil containing the product of the reaction of sulfur reacted at a temperature at which sulfur reacts with the alkaline earth metal compound of the reaction product of a phosphorus sulfide reacted at a temperature of and above thiophosphate formation with an ester having a boiling point above 300° F.

19. A lubricant comprising a lubricating oil containing the product of the reaction of sulfur reacted at a temperature at which sulfur reacts with the metal compound of the reaction product of a phosphorus sulfide and an ester wax reacted at a temperature above thiophosphate formation to form said reaction product containing sulfur from said phosphorus sulfide and separated from a residue containing phosphorus from said phosphorus sulfide.

20. A lubricant comprising a lubricating oil containing the product of the reaction of sulfur reacted at a temperature at which sulfur reacts with the alkaline earth metal compound of the reaction product of a phosphorus sulfide and degras reacted at a temperature above thiophosphate formation to form said reaction product containing sulfur from said phosphorus sulfide and separated from a residue containing phosphorus from said phosphorus sulfide.

JOHN M. MUSSELMAN.
HERMAN P. LANKELMA.

REFERENCES CITED

The following references are of record in the file of this patent:

UNITED STATES PATENTS

| Number | Name | Date |
|---|---|---|
| 2,167,867 | Benning | Aug. 1, 1939 |
| 2,265,851 | Matheson | Dec. 9, 1941 |
| 2,316,087 | Gaynor | Apr. 6, 1943 |
| 2,246,281 | Zimmer | June 17, 1941 |
| 2,246,282 | Zimmer | June 17, 1941 |
| 2,331,923 | Musselman | Oct. 19, 1943 |
| 2,362,624 | Gaynor | Nov. 14, 1944 |

FOREIGN PATENTS

| Number | Country | Date |
|---|---|---|
| 475,787 | British | Nov. 22, 1937 |

Certificate of Correction

Patent No. 2,415,838.  February 18, 1947.

JOHN M. MUSSELMAN ET AL.

It is hereby certified that error appears in the printed specification of the above numbered patent requiring correction as follows: Column 5, lines 59 and 60, claim 16, for "sulfide" read *pentasulfide*; and that the said Letters Patent should be read with this correction therein that the same may conform to the record of the case in the Patent Office.

Signed and sealed this 6th day of May, A. D. 1947.

[SEAL]

LESLIE FRAZER,
*First Assistant Commissioner of Patents.*